(12) United States Patent
Boiger et al.

(10) Patent No.: US 11,897,414 B2
(45) Date of Patent: Feb. 13, 2024

(54) HINGE SYSTEM OF A HOOD OF A VEHICLE

(71) Applicant: Bayerische Motoren Werke Aktiengesellschaft, Munich (DE)

(72) Inventors: Alexander Boiger, Mainburg (DE); Michael Kelm, Friedberg (DE); Walter Meierhofer, Schmidham (DE); Walter Widl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 104 days.

(21) Appl. No.: 17/275,095

(22) PCT Filed: Jul. 10, 2019

(86) PCT No.: PCT/EP2019/068524
§ 371 (c)(1),
(2) Date: Mar. 10, 2021

(87) PCT Pub. No.: WO2020/057796
PCT Pub. Date: Mar. 26, 2020

(65) Prior Publication Data
US 2022/0048462 A1    Feb. 17, 2022

(30) Foreign Application Priority Data
Sep. 17, 2018 (DE) ...................... 10 2018 215 767.7

(51) Int. Cl.
*B60R 21/38* (2011.01)
*E05D 7/00* (2006.01)

(52) U.S. Cl.
CPC ................ *B60R 21/38* (2013.01); *E05D 7/00* (2013.01); *E05Y 2900/536* (2013.01)

(58) Field of Classification Search
CPC ...... B60R 21/38; E05D 7/00; E05Y 2900/536
See application file for complete search history.

(56) References Cited

U.S. PATENT DOCUMENTS

| 6,439,330 B1 | 8/2002 | Paye |
| 6,520,276 B2 * | 2/2003 | Sasaki ..................... B60R 21/38 |
| | | 180/274 |

(Continued)

FOREIGN PATENT DOCUMENTS

| CN | 204899536 U | 12/2015 |
| CN | 106029454 A | 10/2016 |

(Continued)

OTHER PUBLICATIONS

English translation of DE102010029719A1, Published on Dec. 8, 2011 (Year: 2011).*

(Continued)

*Primary Examiner* — Paul N Dickson
*Assistant Examiner* — Shams Dhanani
(74) *Attorney, Agent, or Firm* — Crowell & Moring LLP (57) ABSTRACT

Please substitute the new Abstract submitted herewith for the original Abstract:
A hinge system of a hood of a vehicle has a hinge which is arranged between the hood and a mating element of the vehicle. The hinge is designed both for opening the hood and for raising the hood when the latter is in the closed state, and includes a lifting-piston actuator for initiating a raising movement of the hood. The lifting-piston actuator has a piston element which can be connected to the hinge and/or the hood in a form-fitting manner in order to limit freedom of movement of the hood.

10 Claims, 4 Drawing Sheets

(56) References Cited

U.S. PATENT DOCUMENTS

| | | | |
|---|---|---|---|
| 2004/0124621 A1* | 7/2004 | Knight-Newbury | B60R 21/38 180/274 |
| 2007/0151791 A1 | 7/2007 | Gust | |
| 2017/0050610 A1 | 2/2017 | Narita | |
| 2017/0136985 A1 | 5/2017 | Narita et al. | |
| 2017/0349137 A1 | 12/2017 | Schaurer et al. | |
| 2019/0338567 A1* | 11/2019 | Szente | E05B 77/12 |

FOREIGN PATENT DOCUMENTS

| | | |
|---|---|---|
| CN | 106467140 A | 3/2017 |
| CN | 106800008 A | 6/2017 |
| CN | 107916855 A | 4/2018 |
| DE | 20 2004 002 480 U1 | 4/2004 |
| DE | 10 2004 007 858 A1 | 5/2005 |
| DE | 10 2008 011 722 A1 | 9/2009 |
| DE | 10 2009 040 401 A1 | 3/2011 |
| DE | 10 2010 029 719 A1 | 12/2011 |
| DE | 10 2011 006 133 A1 | 9/2012 |
| DE | 10 2015 203 516 A1 | 9/2016 |
| DE | 10 2015 203 513 A1 | 11/2016 |
| DE | 10 2015 007 336 A1 | 12/2016 |
| EP | 2 351 671 A1 | 8/2011 |

OTHER PUBLICATIONS

International Search Report (PCT/ISA/210) issued in PCT Application No. PCT/EP2019/068524 dated Oct. 9, 2019 with English translation (six (6) pages).

German-language Written Opinion (PCT/ISA/237) issued in PCT Application No. PCT/EP2019/068524 dated Oct. 9, 2019 (six (6) pages).

German-language Search Report issued in German Application No. 10 2018 215 767.7 dated Jun. 17, 2019 with partial English translation (11 pages).

English translation of Chinese Office Action issued in Chinese Application No. 201980046290.4 dated Jun. 22, 2022 (six (6) pages).

* cited by examiner

HINGE SYSTEM OF A HOOD OF A VEHICLE

BACKGROUND AND SUMMARY OF THE INVENTION

The present invention relates to a hinge system of a hood of a vehicle. The invention further relates to a vehicle comprising a hood which has a hinge system of this kind.

Hood hinges for vehicles are known from the prior art. For example, DE 10 2015 203 516 A1 or DE 10 2015 203 513 A1 disclose hinge mechanisms of this kind.

In order to guarantee pedestrian protection, hinge systems of this kind which are known in the art offer the possibility of lifting the hood by a certain amount, even when it is in the locked state, so that a distance between the hood and the components lying thereunder is increased. In this way, the hood can be deformed by the head of a passenger, for example, without this deformation being affected by components lying beneath the hood.

Four-bar kinematics are customarily used in hinge systems known in the art. This means that a hinge upper part and a hinge lower part are coupled by two links which allow a pivoting movement and a lifting movement between the hinge upper part and the hinge lower part. In addition, there is a further pivot point in the hinge upper part which, however, is locked by a locking system. If the hood has to be lifted due to a crash, this pivot point is released, as a result of which the hinge system allows the hood to be lifted even in the locked state. The hinge upper part has a two-part design for this purpose, wherein the hood is lifted by a scissor-like opening of the two parts of the hinge upper part.

With hinge systems of this kind which are particularly known from the previously described documents, there is the risk of a substantial excessive rise in an upswung state of the hood. This means that the hood overswings during the lift-up process and therefore exhibits a maximum height which is up to 100% above the height that should actually be achieved.

The problem addressed by the present invention is that of providing a hinge system of a hood of a vehicle which, through simple and cost-effective production and assembly, limits an overswing of the hood.

The problem is solved by the features of the independent claim. The dependent claims contain preferred developments of the invention.

The problem is therefore solved by a hinge system of a hood of a vehicle. The hood of the vehicle is, in particular, an engine hood of the vehicle. The hood may, in particular, be locked to the vehicle, wherein if this lock is released, the hinge system can open the hood. However, the hinge system allows a lifting of the hood even in the event that the hood is locked. The hinge system particularly comprises a hinge for this purpose which is arranged between the hood and a counter-element of the vehicle. The hinge is designed both for opening the hood and for lifting the hood in the closed state.

Moreover, the hinge system has a lifting-piston actuator. By means of the lifting-piston actuator, an opening force for lifting the hood can be advantageously applied to the hinge upper part. Consequently, a lifting movement of the hood can be introduced by the lifting-piston actuator. For this purpose, the lifting-piston actuator has a piston element. In particular, the lifting-piston actuator is driven by a propellant, so that the hood experiences powerful acceleration. In the prior art, this results in the previously described excessive rise due to an upswing. In order to avoid this kind of excessive rise and/or an upswing of this kind, the piston element can be connected to the hinge and/or to the hood in a form-fitting manner. In this way, the freedom of movement of the hood can be limited, particularly in the direction of the lifting movement. If the hood is an engine hood of the vehicle, a distance between assemblies in the engine compartment of the vehicle and the engine hood can be increased by lifting, so that pedestrian protection is improved. If the head of a passerby should impact against the hood of the vehicle representing an engine hood in a crash scenario, the deformability of the hood is improved due to the increased distance between the hood and the engine compartment assemblies. At the same time, an overswing of the hood is avoided. Particularly advantageously, the piston element of the lifting-piston actuator is separated from the hinge and/or the hood in a retracted position. In an at least partially extended state, the piston element can be connected to the hinge and/or the hood in a form-fitting manner. Consequently, a connection is made between the lifting-piston actuator and hinge and/or hood only during a movement of the piston element. In particular, there is no permanent, form-fitting connection between the piston element and hinge and/or hood, but instead the connection can only be made when the lifting-piston actuator moves the hood.

In particular, the hood has a spring element which keeps the hood in an open position during normal running. If the hood is closed, the aforementioned elastic element is advantageously located in an inoperative position, wherein the hood can be lifted by the lifting-piston actuator. By means of this lifting, the spring element of the hood is also moved out of the inoperative state, as a result of which the hood is preferably lifted on the one hand by the lifting-piston actuator and on the other hand by the spring element. The spring element is, in particular, a gas compression spring.

In order to prevent the hood from overswinging, the hinge advantageously has a strap element. In turn, the strap element has a holding region which is provided for the form-fitting connection to the piston element. The holding region can be advantageously moved by the hinge, in particular by an opening movement of the hinge, in a piston displacement of the piston element. Consequently, it is particularly advantageously provided that the lifting-piston actuator completes a lifting movement in order to initiate a lifting of the hood. The opening movement of the hinge then begins, as a result of which the strap element completes a characteristic opening movement. This opening movement particularly also comprises a movement of the strap element relative to the fixed piston element, so that the holding region can be displaced to the piston element. The opening movement of the hinge upper part moreover comprises a component through which the strap element is moved along the piston element, wherein this movement component is limited on account of the previously described form-fit between the piston element and holding region of the strap element. In this way, the entire opening movement of the hinge is limited, as a result of which an upswing of the hood can be minimized or prevented entirely.

The holding region is preferably part of a through-opening in the strap element, wherein the through-opening also comprises a through-region. It is preferably provided that the through-region of the strap element has a larger cross section than the holding region. The piston element of the lifting-piston actuator can be passed through the strap element at the through-region and cannot be passed through the strap element at the holding region. Consequently, it is particularly made possible for the piston element to be guided through the strap element at the through-region, wherein following a displacement of the piston element into the holding region, the strap element can no longer be separated from the piston element. It can thereby be achieved that the piston element serves to limit a movement of the strap element, and therefore of the hinge. The strap element exhibits, particularly on account of the through-region and the holding region, a keyhole-shaped contour which, on the one hand, allows the piston element to be passed through and, on the other hand, a blocking at the piston element. The piston element therefore also preferably has two different cross-sectional regions, so that once the piston element has been passed through the strap element, a displacement of the piston element into the holding region of the strap element is made possible.

As the holding region, the strap element may also have an elastically deformable region. In this case, it is provided that the piston element is moved through the elastically deformable region with elastic deformation of the elastically deformable region. This can be realized by spring-loaded hoods, for example. The elastically deformable region is particularly designed in such a manner that a backwards movement of the piston element through the elastically deformable region is prevented. Consequently, the piston element can ensure the form-fitting connection to the hinge and/or the hood. In this case, too, no displacement of the holding region to the piston element is required, since the piston element can move through the holding region and the holding region therefore only acts against the direction of movement of the piston element. Alternatively, or in addition, the piston element may also have an elastically deformable region. In particular, the piston element may have an elastically deformable flange region. Consequently, the piston element can move through the holding region of the strap element with elastic deformation, wherein a backwards movement of the lifting piston through the elastically deformable region is in turn prevented.

The piston element preferably has a flange-shaped region. The flange-shaped region is larger in size than the holding region of the strap element, but at the same time is smaller in size than the through-region of the flange element. In this way, it is made possible for the flange-shaped region to be guided through the through-region, but not through the holding region. If the piston element is displaced into the holding region after the flange-shaped region is guided through the through-region, the strap element is blocked at the flange-shaped region of the piston element. Consequently, a movability of the hinge upper part can be advantageously limited. The flange-shaped region of the piston element can also be advantageously provided when the holding region is not a region in the through-opening. In particular, the flange-shaped region can only rest against the holding region sectionally. Particularly advantageously, the holding region can be formed by an edge against which the piston element can be placed with the flange-shaped region. As previously described, it is particularly advantageously provided that the holding region, in particular the edge, can be moved in a piston displacement of the piston element.

Moreover, the hinge system advantageously has an elastic element. The elastic element is used for applying a force to the piston element in the direction of the holding region of the strap element. Alternatively or in addition, the elastic element is used to block the piston element in the holding region. In particular, the elastic element is a plate spring. The plate spring covers the through-region, so that the elastic element designed as a plate spring is deformed when the piston element of the lifting-piston actuator is guided through the through-region of the strap element. As soon as the strap element is displaced and the piston element moves into the holding region, the elastic element moves back into its original position and once again conceals the through-region. In this way, the piston element can no longer get back to the through-region, as a result of which a release of the strap element and piston element is prevented.

The hinge system preferably has a hinge upper part with a main link and a hood part. Two links are attached to the main link and these are moreover supported on the counter-element of the vehicle. Consequently, a four-bar mechanism is produced between the counter-element and the main link. This corresponds to known kinematics which are used in the prior art for hoods of vehicles. The hood part of the hinge upper part is used to fasten the hinge system to the hood. A fixing element is particularly provided in order to prevent a relative movement between the main link and the hood part.

Moreover, it is provided that the hood part is fastened to the main link so as to be rotatable at a bearing point and is connected to the main link in a non-rotatable manner by the fixing element. The fixing element can, in turn, be released by the lifting-piston actuator. Consequently, the fixing element can be released in order to allow torsion between the hood part and the main link about the bearing point. This means that in a normal operating state the main link and the upper part of the flap represent a unit which is not relatively movable. Consequently, the front flap can be opened with the help of the four-bar kinematics when the front flap is unlocked. If, on the other hand, the fixing element is released, the four-bar mechanism can lift the hood, since a compensating movement through relative rotation of the main link and the hood part about the bearing point is made possible. In this case, the hood remains unlocked.

It is preferably provided that the strap element is fastened to the hinge upper part, in particular to the main link of the hinge upper part. Consequently, it is made possible for a movement of the main link to be limited. In this way, a movement of the hinge upper part itself is, in particular, limited. This means that an upswing of the hood during the lifting action is limited.

The fixing element advantageously has a predetermined breaking point. The predetermined breaking point can be broken by the lifting-piston actuator. Alternatively or in addition, the fixing element has a latch device which can be actuated by the lifting-piston actuator. Consequently, it is achieved that during normal operation the fixing element fixedly connects the main link and the hood part, while this connection is released only in a crash scenario by the lifting-piston actuator.

The hood part is advantageously mounted in a slot in the main link by means of a holding element. In this way, a maximum torsion angle is defined between the main link and the hood part. This means that a limit on the movability of the main link also leads to a restriction on the movability of the hood part. In this way, a movability of the entire hinge upper part, i.e. of the main link and the hood part, is limited by the flap element.

The invention further relates to a vehicle. The vehicle comprises a hood, as previously described. The hood is, in particular, an engine hood which covers the vehicle's engine compartment. The hood can be actuated by a hinge system, as previously described. Consequently, on the one hand the hood can be opened in the traditional manner by the hinge system; on the other hand, the hood can be lifted by the hinge system, in order to improve pedestrian protection in a crash scenario. The hood can be lifted to a predefined protection height by virtue of the hinge system. The predefined protection height is, in particular, 60 mm above the closed state of the hood. During the lifting action, an overswing of the hood is limited to max. 25% above the predefined protection height. This is achieved by a corresponding design of the lifting-piston actuator and strap element.

Further details, features and advantages of the invention result from the following description and the figures.

BRIEF DESCRIPTION OF THE DRAWINGS

Figure 1:
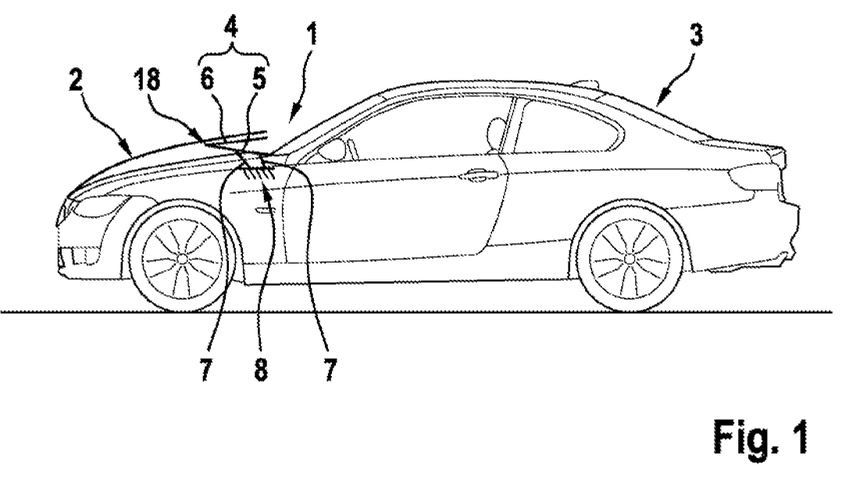
FIG. 1 shows a schematic view of a vehicle according to an exemplary embodiment of the invention.

FIG. 1 shows schematically a vehicle 3 comprising a hood 2 with a hinge system 1 according to an exemplary embodiment of the invention. This particularly shows schematically how the hood 2 can be lifted by the hinge system 1, so that better protection can be achieved for pedestrians in a crash scenario.

The hinge system 1 comprises a hinge with a hinge upper part 4 which includes a main link 5 and a hood part 6. The hood part 6 is fastened to the hood 2. The main link 5 is coupled with a counter-element 8 of the body of the vehicle 3 by means of two links 7. The main link 5 and hood part 6 can be twisted relative to one another by means of a bearing point 18. In this way, it is possible for the hood 2 to be lifted at the hinge system 1, while at the same time the hood 2 remains locked at a vehicle front.

Figure 2:
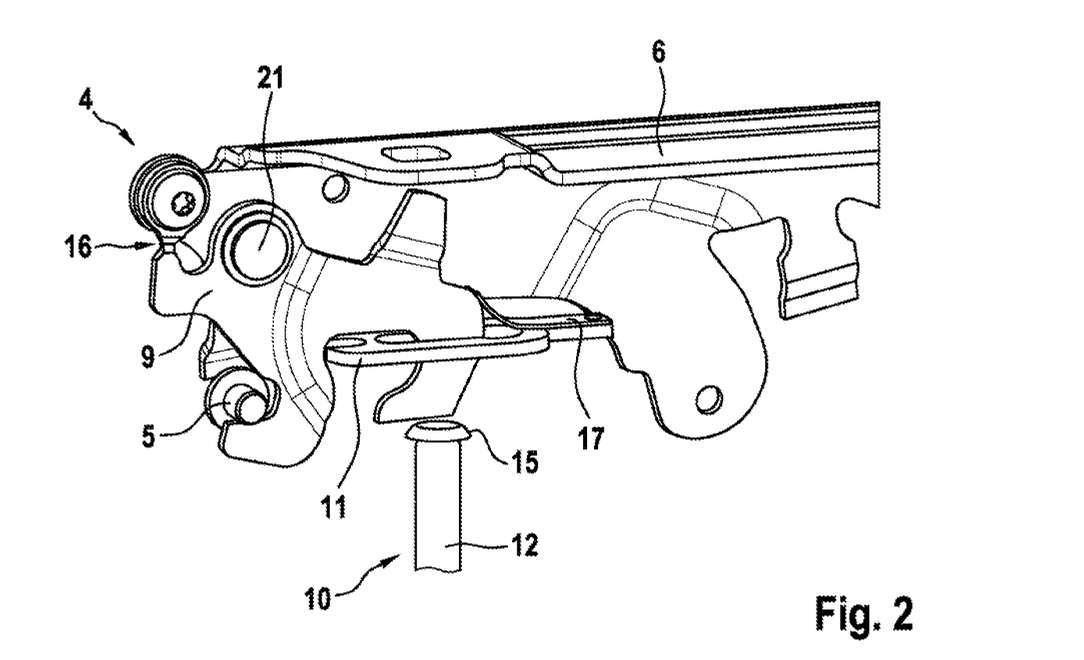
FIG. 2 shows a first schematic view of a partial region of a hinge system according to an exemplary embodiment of the invention.
Figure 3:
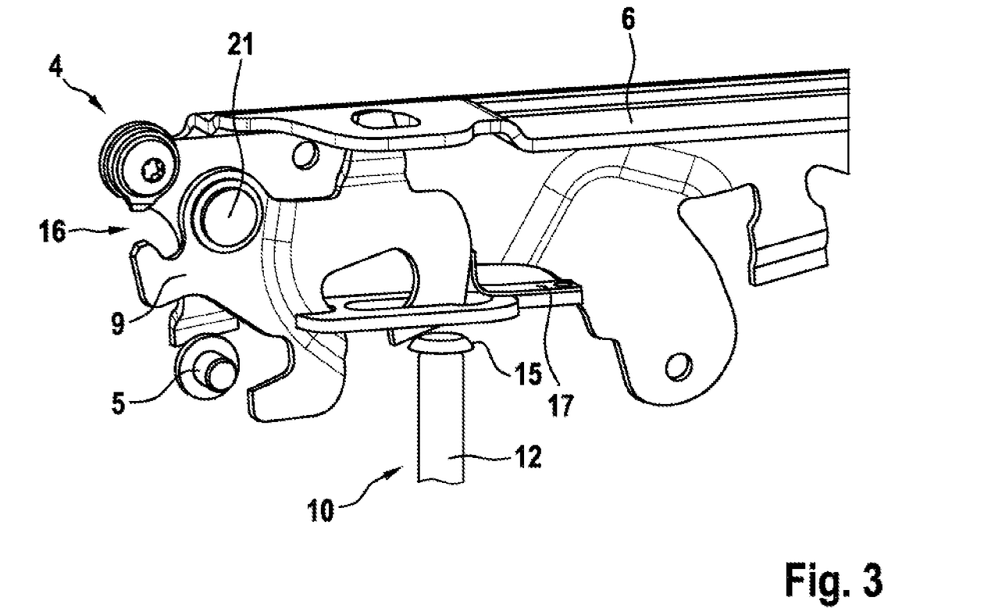
FIG. 3 shows a second schematic view of the partial region of the hinge system according to the exemplary embodiment of the invention.
Figure 4:
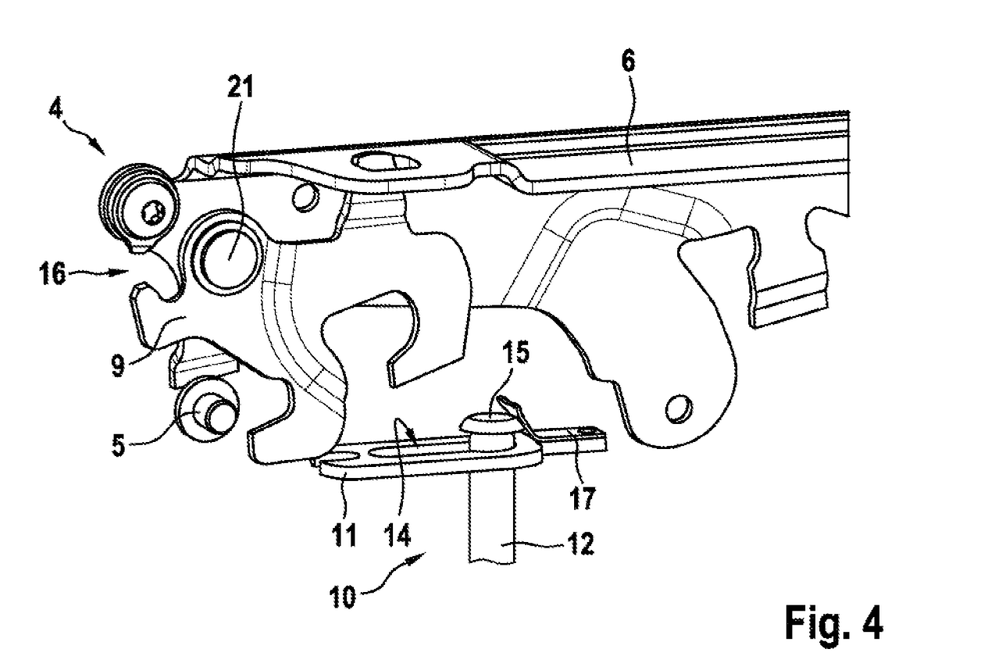
FIG. 4 shows a third schematic view of the partial region of the hinge system according to the exemplary embodiment of the invention.

FIGS. 2 to 4 show schematically a lifting action of the hood 2 in which the hood 2 is opened as shown in FIG. 1. The hood part 6 is shown in this way in FIGS. 2 to 4, in particular, wherein only the relevant partial region of the main link 5 for coupling with the hood part 6 is depicted. Moreover, the bearing point 18 is not shown in FIGS. 2 to 4, since it is attached to an opposite end of the end of the hood part 6 which is shown in FIGS. 2 to 4.

By means of a fixing element 9, the hood part 6 is fixedly connected to the main link 5. The connection is possible through rotation of the fixing element 9 about a pivot point 21, since with a rotation of this kind the fixing at the main link 5 is released. In particular, FIG. 2 shows the fixed state, while FIG. 3 shows the released state. As soon as the fixing element 9 is moved into a released position, a relative twisting of the hood part 6 and the main link 5 about the bearing point 18 is made possible.

In order to ensure that in a customary operating state the hinge upper part 4 acts as a single part, i.e. in order to achieve a fixed connection between the main link 5 and the hood part 6 during normal operation, a rotation of the fixing element 9 about the pivot point 21 is prevented by a predetermined breaking point 16. A rotation of the fixing element 9 is possible only when the predetermined breaking point 16 is broken. This is likewise shown in FIG. 3.

The release of the fixing element, i.e. on the one hand the breakage of the predetermined breaking point 16 and, on the other hand, the release of the fixed connection of the main link 5 and hood part 6 takes place by means of a lifting-piston actuator 10. The lifting-piston actuator 10 particularly comprises a propellant which presses a piston element 12 onto the fixing element 9, as a result of which a torque acts about the pivot point 21 which leads to a breakage of the predetermined breaking point 16. At the same time, the main link 5 and the hood part 6 are uncoupled through the rotation of the fixing element 9.

The fixing element 9 grips partially through a strap element 11 which is fixedly connected to the main link 5. When the lifting-piston actuator 10 is actuated and the piston element 12 is moved in the direction of the fixing element 9, the piston element 12 moreover penetrates the strap element 11. This scenario is shown in FIG. 4. Through penetration of the strap element 11 and pressing of the piston element 12 onto the fixing element 9, a movement of the hood part 6 in an opening direction of the hinge system 1 also takes place, so that the lifting-piston actuator 10 brings about, or at least initiates, the lifting of the hood 2. In addition, there is advantageously a spring element, preferably a gas pressure spring, between the hood 2 and the counter-element 8, which at least supports a lifting of the hood 2.

The piston element 12 is moreover used to prevent an overswing of the hood 2 during the lifting action or opening action. Consequently, the piston element 12 has a flange-shaped region 15. At the flange-shaped region 15, a cross section of the piston element 12 is greater than at other regions of the piston element 12. As particularly emerges from FIGS. 5 and 6, the strap element comprises an opening with two different regions, a through-region 13 and a holding region 14. The through-region 13 has a larger cross-sectional area than the holding region 14.

Figure 5:
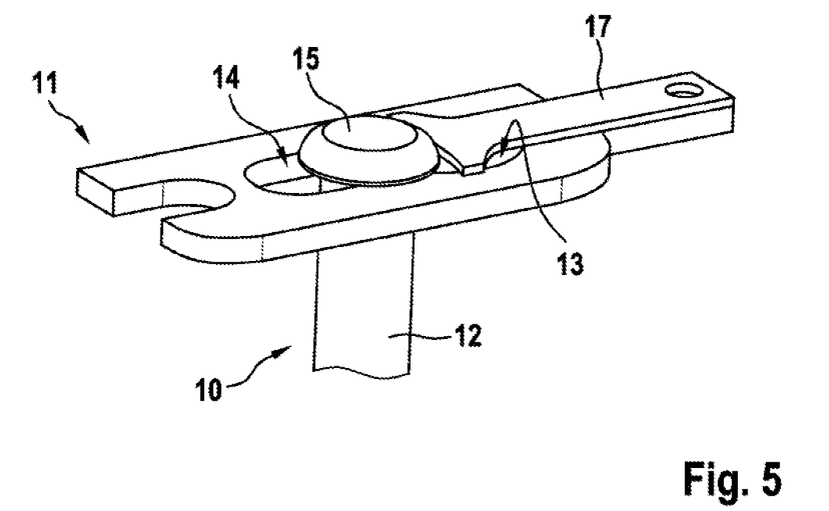
FIG. 5 shows a first schematic view of the strap element of the hinge system according to an exemplary embodiment of the invention.
Figure 6:
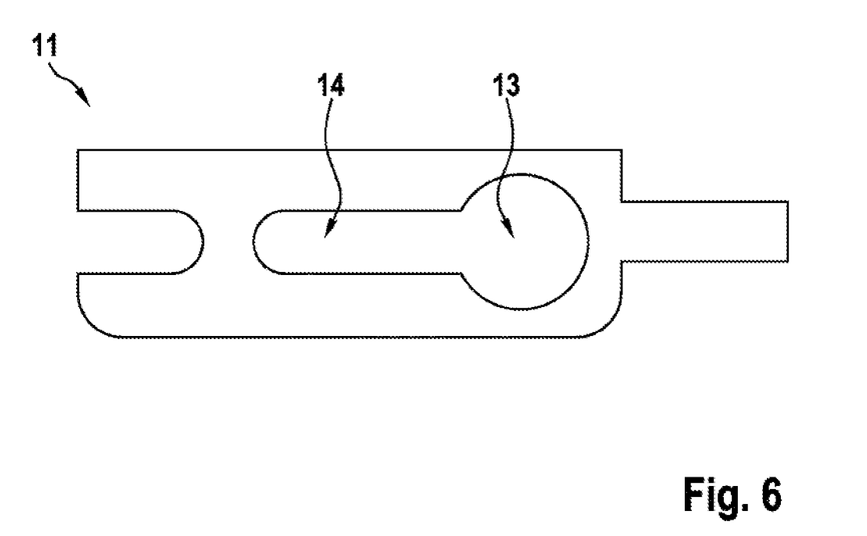
FIG. 6 shows a second schematic view of the strap element of the hinge system according to the exemplary embodiment of the invention.

It is particularly provided that the through-region 13 has a cross section of such a kind that the flange-shaped region 15 of the piston element 12 can be guided through the through-opening in the strap element 11 at this point. On the other hand, the flange-shaped region 15 cannot be guided through the holding region 14 of the strap element 11, since the holding region 14 has a cross section which is smaller than the size of the flange-shaped region 15 of the piston element 12. The lifting-piston actuator 10 is arranged in such a manner that the piston element 12 is guided through the through-region 13 of the strap element 11 when the lifting-piston actuator 10 is actuated. As previously described, by actuating the lifting-piston actuator 10 there is, moreover, an opening movement of the hinge system 1 for lifting the hood 2. Since the strap element 11 is fixedly connected to the main link 5, the strap element 11 is also moved relative to the piston element 12. This movement is, in particular, predefined by the arrangement of the links 7. It is provided that the strap element 11 is arranged in such a manner that the opening movement of the hinge system 1 brings about a displacement of the strap element 11 in such a manner that the piston element 12 is located in the holding region 14. Consequently, there is a displacement of the piston element 12 in the holding region 14, so that the strap element 11 can no longer be separated from the piston element 12. Instead, there is a blockade at the flange-shaped region 15.

The arrangement of the piston element 12 means that a movement of the main link 5 is restricted. As soon as the strap element 11 rests against the flange-shaped region 15, a further movement of the main link 5 is no longer possible. Consequently, an opening height of the hood 2 is limited. This leads, in particular, to a limitation of the upswing of the hood 2 during lifting.

Figure 7:
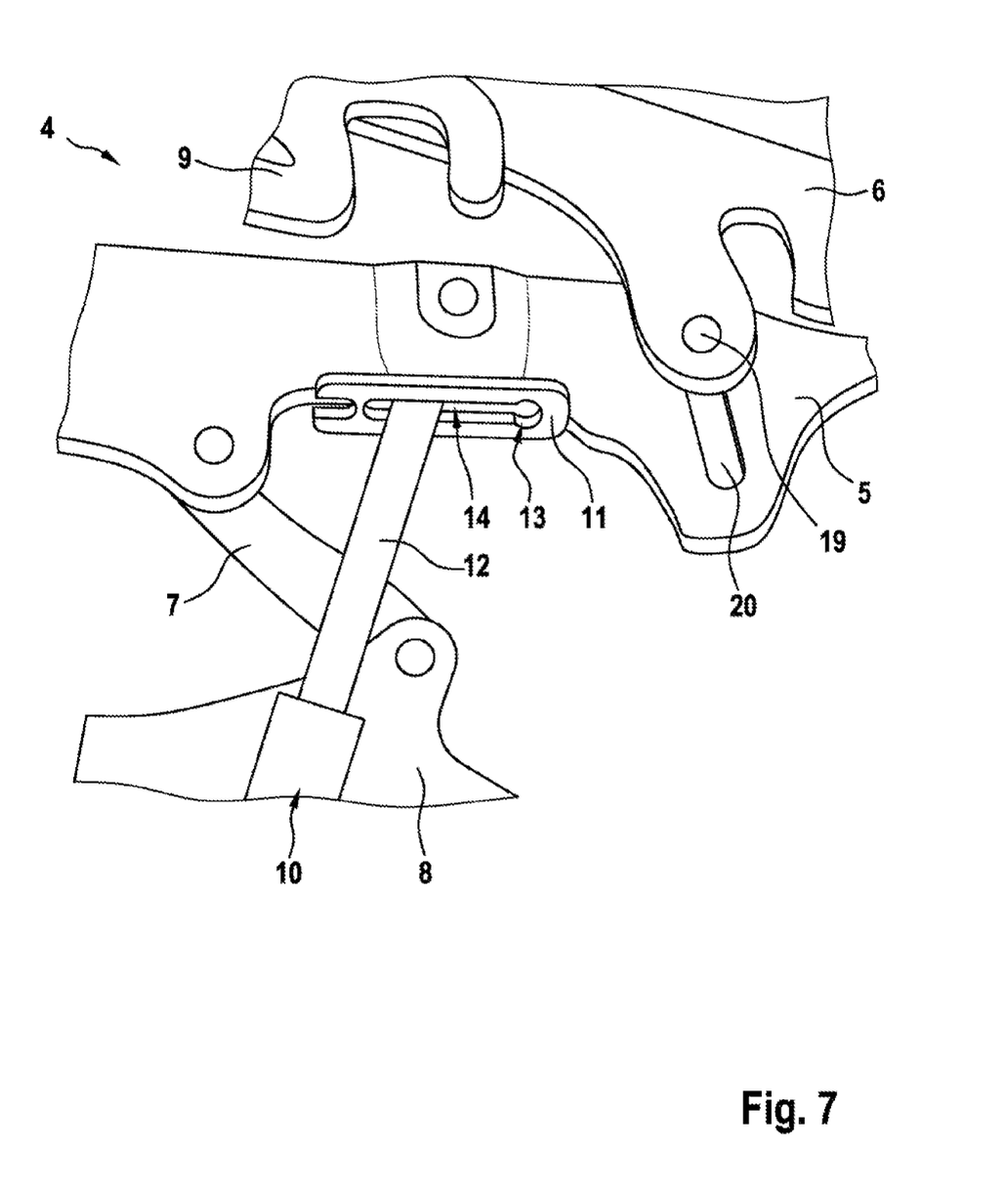
FIG. 7 shows a schematic view of the hinge system according to the exemplary embodiment of the invention.

FIG. 7 shows the hinge system schematically in a completely upswung state. Hence, it shows that the strap element 11 which is fastened to the main link 5 directly rests against the flange-shaped region 15 of the piston element 12 of the lifting-piston actuator 10. A further lifting of the hood 2 is therefore no longer possible.

By placing the strap element 11 against the flange-shaped region 15, only the main link 5 is initially blocked. However, the hood part 6 is mounted by means of a holding element 19 in a slot 20 of the main link 5. In this way, a maximum torsion angle is established between the main link 5 and the hood part 6. Consequently, it is likewise achieved that the hood part 6 is also limited by the piston element 12 in terms of its freedom of movement.

In order to prevent the piston element 12 from slipping out of the strap element 11 at the through-region 13, an elastic element 17 is provided. The elastic element 17 conceals the through-region 13. As soon as the piston element 12 is guided through the first region 13, there is an elastic deformation of the elastic element 17. Following the displacement of the strap element 11 relative to the piston element 12, the elastic element 17 is moved back into its original position on account of its elastic resetting force, so that the elastic element 17 in turn covers the through-region 13. Consequently, the piston element 12 can no longer be moved back to the through-region 13, so that a release of the piston element 12 and the strap element 11 is effectively prevented.

By means of the hinge system according to the exemplary embodiment of the invention, it can, in particular, be achieved that the front flap 2 displays an overswinging behavior during the lifting action, the amplitude of said overswinging behavior being limited. In particular, the amplitude is limited in such a manner that a maximum height of the hood 2 is 25% higher than a predefined protection height. Consequently, an upswing is limited to max. 25% above the predefined protection height. The predefined protection height may, in particular, be a height of 60 mm.

LIST OF REFERENCE NUMBERS 1 hinge system
2 hood
3 vehicle
4 hinge upper part
5 main link
6 hood part
7 link
8 counter-element
9 fixing element
10 lifting-piston actuator
11 strap element
12 piston element
13 through-region
14 holding region
15 flange-shaped region
16 predetermined breaking point
17 elastic element
18 bearing point
19 holding element
20 slot
21 pivot point

What is claimed is:

1. A hinge system of a hood of a vehicle, comprising:
a hinge which is arranged between the hood and a counter-element of the vehicle, wherein the hinge is configured both for opening the hood and for lifting the hood in a closed state; and
a lifting-piston actuator for introducing a lifting movement of the hood, wherein
the lifting-piston actuator has a piston element which is connectable to the hinge and/or to the hood in a form-fitting connection, in order to limit a freedom of movement of the hood, wherein
the hinge has a strap element with a holding region for the form-fitting connection to the piston element,
the holding region is movable by the hinge in a piston displacement of the piston element,
the holding region is a region of a through-opening in the strap element,
the through-opening comprises a through-region with a larger cross section than the holding region, and
the piston element is passable through the strap element at the through-region and not passable through the strap element at the holding region.

2. The hinge system according to claim 1, wherein the piston element has a flange-shaped region which is larger in size than the holding region but is smaller in size than the through-region.

3. The hinge system according to claim 1, further comprising:
an elastic element for application of a force to the piston element in a direction of the holding region and/or for blocking the piston element in the holding region.

4. A hinge system of a hood of a vehicle, comprising:
a hinge which is arranged between the hood and a counter-element of the vehicle, wherein the hinge is configured both for opening the hood and for lifting the hood in a closed state; and
a lifting-piston actuator for introducing a lifting movement of the hood, wherein
the lifting-piston actuator has a piston element which is connectable to the hinge and/or to the hood in a form-fitting connection, in order to limit a freedom of movement of the hood in a lifting direction, wherein the hinge comprises:
a hinge upper part with a main link and a hood part;
two links which are each attached rotatably to the main link and to the counter-element of the vehicle, in order to produce a four-bar mechanism,
wherein the hood part is configured for fastening to the hood,
wherein the hood part is fastened to the main link so as to be rotatable at a bearing point and is connected to the main link in a non-rotatable manner by a fixing element, and
wherein the fixing element is releasable by the lifting-piston actuator, in order to achieve torsion between the hood part and the main link.

5. The hinge system according to claim 4, wherein the hinge has a strap element with a holding region for the form-fitting connection to the piston element,
the holding region is movable by the hinge in a piston displacement of the piston element, and
the strap element is fixedly coupled with the hinge upper part.

6. The hinge system according to claim 4, wherein
the hinge has a strap element with a holding region for the form-fitting connection to the piston element,
the holding region is movable by the hinge in a piston displacement of the piston element, and
the strap element is fastened to the main link.

7. The hinge system according to claim 4, wherein
the fixing element has a predetermined breaking point that can be broken by the lifting-piston actuator and/or a latch device which can be actuated by the lifting-piston actuator.

8. The hinge system according to claim 4, wherein
the hood part is mounted via a holding element in a slot of the main link, so that a maximum torsion angle is established between the main link and the hood part.

9. A vehicle, comprising:
a hood; and
a hinge system comprising:
  a hinge which is arranged between the hood and a counter-element of the vehicle, wherein the hinge is configured both for opening the hood and for lifting the hood in a closed state; and
  a lifting-piston actuator for introducing a lifting movement of the hood,
wherein
  the lifting-piston actuator has a piston element which is connectable to the hinge and/or to the hood in a form-fitting connection, in order to limit a freedom of movement of the hood,
  the hinge has a strap element with a holding region for the form-fitting connection to the piston element,
  the holding region is movable by the hinge in a piston displacement of the piston element,
  the holding region is a region of a through-opening in the strap element,
  the through-opening comprises a through-region with a larger cross section than the holding region,
  the piston element is passable through the strap element at the through-region and not passable through the strap element at the holding region,
    wherein the hood is lifted by the hinge system to a predefined protection height, and
    during the lifting action, an overswing is limited to maximum of 25% above the predefined protection height.

10. The vehicle according to claim 9, wherein the predefined protection height is approximately 60 mm.

\* \* \* \* \*